(12) United States Patent
Gallo et al.

(10) Patent No.: US 12,675,760 B2
(45) Date of Patent: Jul. 7, 2026

(54) PREDICTING PERFORMANCE STATISTICS OF A PLAYER USING MACHINE-LEARNING TECHNIQUES

(71) Applicant: Mojo Interactive, Inc., New York, NY (US)

(72) Inventors: Michael Gallo, New York, NY (US); Julie Helmers, New York, NY (US); Kevin Whitaker, South Orange, NJ (US); Elizabeth Pemberton, Roselle Park, NJ (US)

(73) Assignee: Mojo Interactive, Inc., New York, NY (US)

( * ) Notice: Subject to any disclaimer, the term of this patent is extended or adjusted under 35 U.S.C. 154(b) by 91 days.

(21) Appl. No.: 17/714,947

(22) Filed: Apr. 6, 2022

(65) Prior Publication Data

US 2023/0325755 A1     Oct. 12, 2023

(51) Int. Cl.
   *G06Q 10/0639*        (2023.01)
   *G06N 20/20*          (2019.01)
(52) U.S. Cl.
   CPC ....... *G06Q 10/06398* (2013.01); *G06N 20/20* (2019.01); *G06Q 10/06393* (2013.01)
(58) Field of Classification Search
   None
   See application file for complete search history.

(56) References Cited

U.S. PATENT DOCUMENTS

| | | | | |
|---|---|---|---|---|
| 2015/0248917 A1* | 9/2015 | Chang | ............... | G11B 27/031 386/282 |
| 2017/0109015 A1* | 4/2017 | Krasadakis | ........... | G06F 16/335 |
| 2020/0188733 A1* | 6/2020 | Beckwith | ............. | A42B 3/0433 |
| 2020/0230501 A1* | 7/2020 | Schwartz | ............... | G06Q 50/34 |
| 2023/0077428 A1* | 3/2023 | Provencher | ........... | G06F 16/953 707/709 |
| 2023/0109001 A1* | 4/2023 | Goonetilleke | ......... | G06V 30/10 705/306 |

FOREIGN PATENT DOCUMENTS

| | | | | |
|---|---|---|---|---|
| CN | 111954564 A | * | 11/2020 | ............. G06N 20/20 |

OTHER PUBLICATIONS

Victor Chazan et al., Sports Analytics for Football League Table and Player Performance Prediction, 2020 IEEE (Year: 2020).*

* cited by examiner

*Primary Examiner* — Jerry O'Connor
*Assistant Examiner* — Matthew H Divelbiss
(74) *Attorney, Agent, or Firm* — Fenwick & West LLP

(57) ABSTRACT

A system and a method are disclosed for a platform that predicts performance metrics for a person of interest (POI) in real-time and over an extended time period. The platform extracts attributes of the POI, attributes of a team corresponding to the POI, and inherent properties of an event corresponding to the POI. The platform generates a live component vector comprising the extracted attributes and inherent properties and inputs the live component vector to a first machine learning model to determine a live metric characterizing the performance of the POI during a current event. The platform generates a career component vector by updating the live component vector with one or more live metrics determined by the first machine learning model. The platform inputs the career component vector to a second machine learning model to determine a career metric characterizing the long-term performance of the POI during an extended time period.

18 Claims, 6 Drawing Sheets

Identify a POI and the event that the POI participates in
305

Extract attributes of the POI and the POI's team and inherent features of the event
310

Generate a live component vector from the attributes of the POI and the inherent features of the event
315

Input the live component vector into a machine learning model to predict a live metric characterizing the performance of the POI during a current event
320

Normalize the predicted live metric based on an actual performance of the POI during the current event
325

100

Projection Platform
100

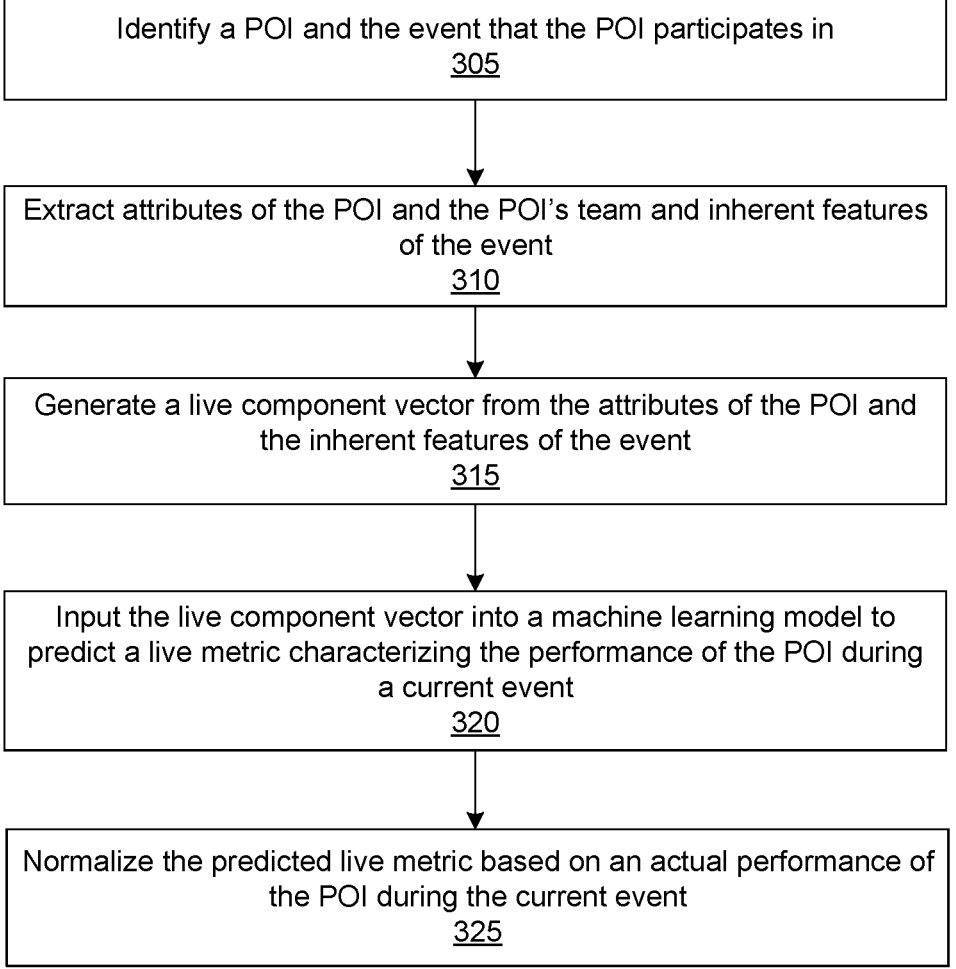

Identify a POI and the event that the POI participates in
305

Extract attributes of the POI and the POI's team and inherent features
of the event
310

Generate a live component vector from the attributes of the POI and
the inherent features of the event
315

Input the live component vector into a machine learning model to
predict a live metric characterizing the performance of the POI during
a current event
320

Normalize the predicted live metric based on an actual performance of
the POI during the current event
325

*FIG. 3*

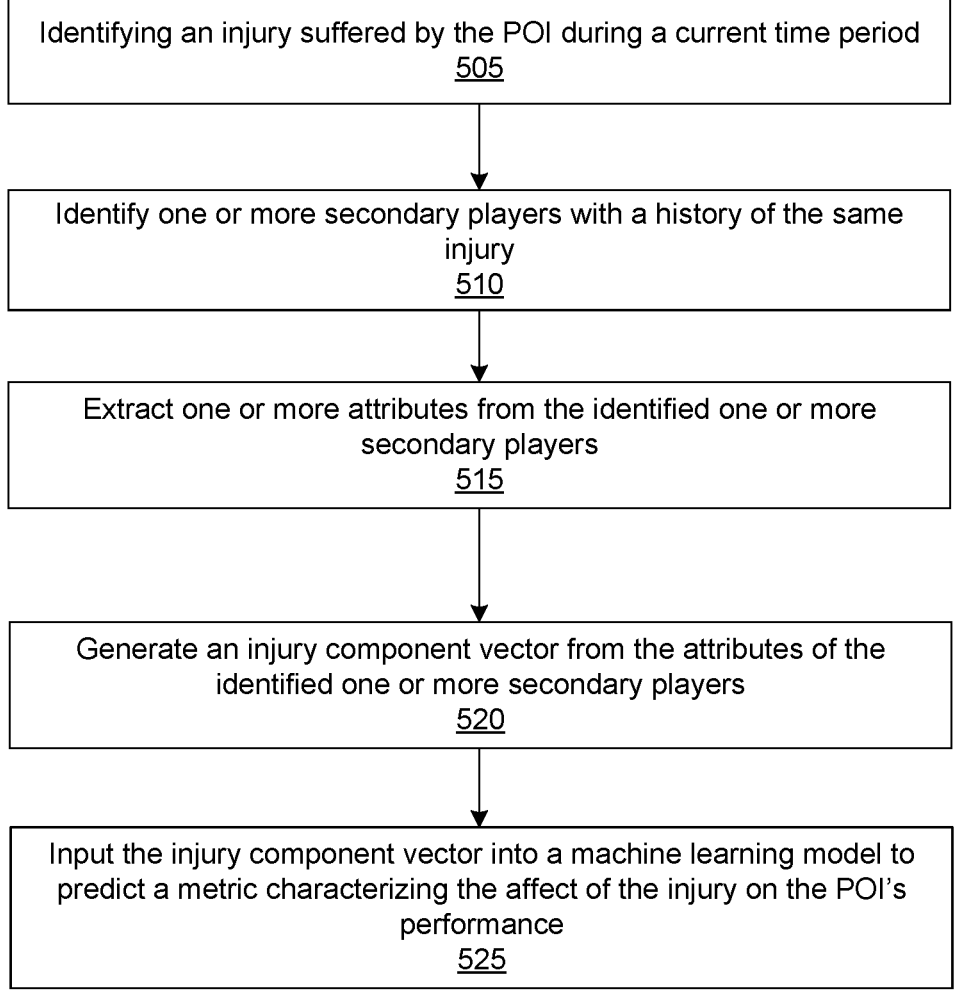

Identifying an injury suffered by the POI during a current time period
505

Identify one or more secondary players with a history of the same
injury
510

Extract one or more attributes from the identified one or more
secondary players
515

Generate an injury component vector from the attributes of the
identified one or more secondary players
520

Input the injury component vector into a machine learning model to
predict a metric characterizing the affect of the injury on the POI's
performance
525

FIG. 5

PREDICTING PERFORMANCE STATISTICS OF A PLAYER USING MACHINE-LEARNING TECHNIQUES

TECHNICAL FIELD

This disclosure generally relates to machine learning and, more specifically, to predicting the performance of a person of interest using machine learning models.

BACKGROUND

A person's performance in an event or a field may fluctuate over time in response to various external circumstances and conditions affecting the person. For example, an athlete's individual performance statistics may decline in response to an injury or a reduced role on their team. Alternatively, the athlete's individual performance statistics may improve when they are part of a competitive team or are a featured player on a team. Accordingly, predictions a person's performance based on attributes over time cannot be modeled using conventional systems, as they fail to consider such inherent attributes of the person in combination with the external factors surrounding the person. In addition to being unable to generate real-time or near real-time predictions, conventional systems are additionally only able to generate predictions for short-term time periods.

Additionally, even if conventional systems were to consider such a combination of inherent data and external factors, the sheer volume of available conditions or events that may factor into the prediction would render such a task impractical, given the processing power and network resources required to gather and process such data. More specifically, training such a conventional system to consider these external factors in a manner robust enough to reliably predict the current performance of an individual would be neither practical nor computationally efficient.

SUMMARY

Embodiments of a disclosed system, method, and computer-readable storage medium predict real-time and end-of-career performance statistics of a person of interest using a combination of machine-learning models and techniques. The predicted statistics may be related to attributes of the person of interest collected continuously over the course of their career, attributes of a team corresponding to the person of interest, and inherent properties of the event or field that the person of interest participates in. The result is a robust dataset of attributes that conventional prediction models or prediction platforms are incapable of processing in a computationally efficient manner. Additionally, performance statistics of a person may fluctuate over time based on various dynamic external conditions. For example, the performance of an individual may improve as their playing time on the team increases but may decrease if they suffer an injury. Accordingly, the performance prediction of a person is adjusted over time to account for such dynamic events or conditions.

The systems and methods disclosed herein describe a performance projection platform capable of handling a robust amount of data and accounting for dynamic events or conditions in a computationally efficient manner. To accommodate the robust volume of data describing attributes of a person of interest, their team, and inherent properties of an event the person participates in, the performance projection platform implements various techniques to consolidate and optimize the volume of compiled data. The performance projection platform aggregates a combination of attributes or features collected from third-party servers and stored in remote databases into component vectors of the person of interest, which are ultimately input to machine learning models.

A performance projection platform accesses performance data comprising attributes of a person of interest (POI), attributes of a team corresponding to the POI, and inherent properties of an event that the POI participates in and generates a live component vector based on the accessed performance data. The asset projection platform inputs the live component vector to a first machine learning model trained to determine a live metric characterizing the performance of the POI during a current event. The asset projection platform generates a career component vector comprising one or more live metrics determined by the first machine learning model and components of the live component vector. The first machine learning model is trained using a first training dataset where each entry of training data comprises a set of attributes of a person and their corresponding team and is labeled with a metric characterizing a historical performance of the person during a given event.

The asset projection platform inputs the career component vector into a second machine learning model trained to determine a career metric characterizing the overall performance of the POI during a time period. The second machine learning model is trained using a second training dataset where each entry of training data comprises a set of attributes of a person and their corresponding team and historical performances and is labeled with a metric characterizing an overall performance of the person during a time period.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 3 is a block diagram illustrating components of an example machine able to read instructions from a machine-readable medium and execute them in a processor (or controller), according to an embodiment.

FIG. 5 is an exemplary data flow for determining a metric characterizing the affect of an injury on the player's career, according to an embodiment.

DETAILED DESCRIPTION

The figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture for a Projection Platform

Figure 1:
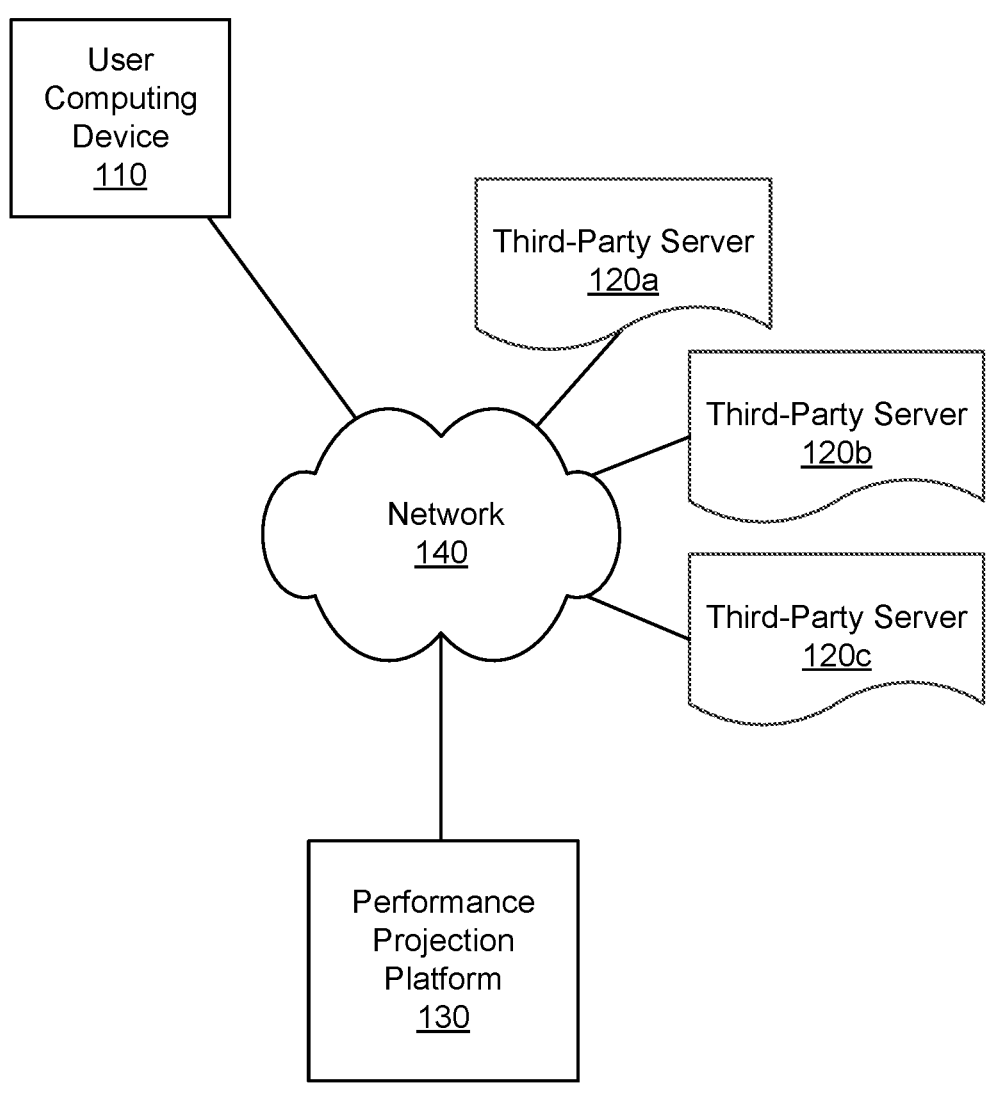
FIG. 1 illustrates a system architecture for a performance projection platform, according to an embodiment.

FIG. 1 illustrates a system architecture for a projection platform 100, according to an embodiment. The platform 100 includes a user computing device 110, third-party servers 120, a performance projection platform 130, and a network 140. However, in other embodiments, the platform 100 may include different and/or additional components. In the illustrated embodiment of FIG. 1, only one user computing device 110 is illustrated The user computing device 110 is a computing device with data processing and data communication capabilities, capable of receiving inputs from a provider. The user computing device 110 may be operated by an end-point user, hereafter referred to as a provider, to enter and review performance data, predicted performance statistics, and actual performance statistics applied by the performance projection platform 130. An example physical implementation is described more completely below with respect to FIG. 3. The user computing device 110 may be a computing device such as smartphones with an operating system such as ANDROID® or APPLE® IOS®, tablet computers, laptop computers, desktop computers, electronic stereos in automobiles or other vehicles, or any other type of network-enabled device on which digital content may be listened to or otherwise experienced. The user computing device 110 may include functionality, which allows the device 110 to record speech responses articulated by a provider operating the device (e.g., a microphone), and to graphically present data to a provider (e.g., a graphics display). In addition, typical client devices include the hardware and software needed to input and output sound (e.g., speakers and microphone) and images, connect to the network 150 (e.g., via Wifi and/or 4G or other wireless telecommunication standards), determine the current geographic location of the user computing device 110 (e.g., a Global Positioning System (GPS) unit), and/or detect motion of the user computing device 110 (e.g., via motion sensors such as accelerometers and gyroscopes).

Third party servers 120a, 120b, and 120c store various aspects of performance data, for example a person's performance statistics most recently recorded during an event or intrinsic attributes of the performance. Data stored at the third-party servers 120 may be extracted, compiled, and stored by the performance projection platform 130 described below.

The performance projection platform 130 predicts performance statistics for a person of interest (hereafter referred to as a "POI") based on a combination of performance data compiled and stored from third-party servers 120 and previous predictions generated by the performance projection platform 130. In one embodiment, the performance projection platform 130 predicts live performance metrics while the POI is participating in an event based on attributes and data collected in real-time during the event. The performance projection platform 130 may further predict a performance metrics over a period of time, for example the POI's performance during their first year with a team or their performance over their entire career. Particulars of the functionality of the performance projection platform 130 are further discussed below with reference to FIG. 2-6.

A person of interest may be any individual whose participation in an event is monitored or evaluated. For example, a POI may be an athlete competing in a sport or an employee on a professional team. For the sake of explanation, the techniques and processes described herein are described with reference to a player on a sports team. However, one having ordinary skill in the art would appreciate that the techniques and processes described herein may be applied to any individual (e.g., person of interest) subject to a performance evaluation in any context.

"Performance metrics" are determined by the performance projection platform 130 as the result of inputting performance data into machine-learned models to characterize a POI's real-time performance and their performance over an extended time period. In some embodiments, performance metrics may be a numerical value characterizing or representing the performance of a POI as a score. In other embodiments, performance metrics may be a verbal label describing the performance of the POI. Given the dynamic nature of a POI's performance, performance metrics represent a prediction regarding the POI at a particular point in time or range of times. Accordingly, a POI may be characterized over time by tracking fluctuations in the POI's predicted performance metrics over a range of times.

Interactions between the user computing device 110, the third-party servers 120, and the performance projection platform 130, are typically performed via the network 140, which enables communication between the user computing device 110 and the performance projection platform 130. In one embodiment, the network 140 uses standard communication technologies and/or protocols including, but not limited to, links using technologies such as Ethernet, 600.11, worldwide interoperability for microwave access (WiMAX), 3G, 4G, LTE, digital subscriber line (DSL), asynchronous transfer mode (ATM), InfiniBand, and PCI Express Advanced Switching. The network 140 may also utilize dedicated, custom, or private communication links. The network 150 may comprise any combination of local area and/or wide area networks, using both wired and wireless communication systems.

Predicting Performance Metrics Using a Performance Projection Platform

The performance projection platform 130 maintains performance data compiled for and assigned to a person of interest (POI) and determines predictions for the performance of the POI. Predictions may be determined in real-time as the POI participates and performs in an event or may be determined at periodic intervals (e.g., the conclusion of an event), in response to a request from a user operating a user computing device 110, in response to another trigger condition, or a combination thereof.

Figure 2:
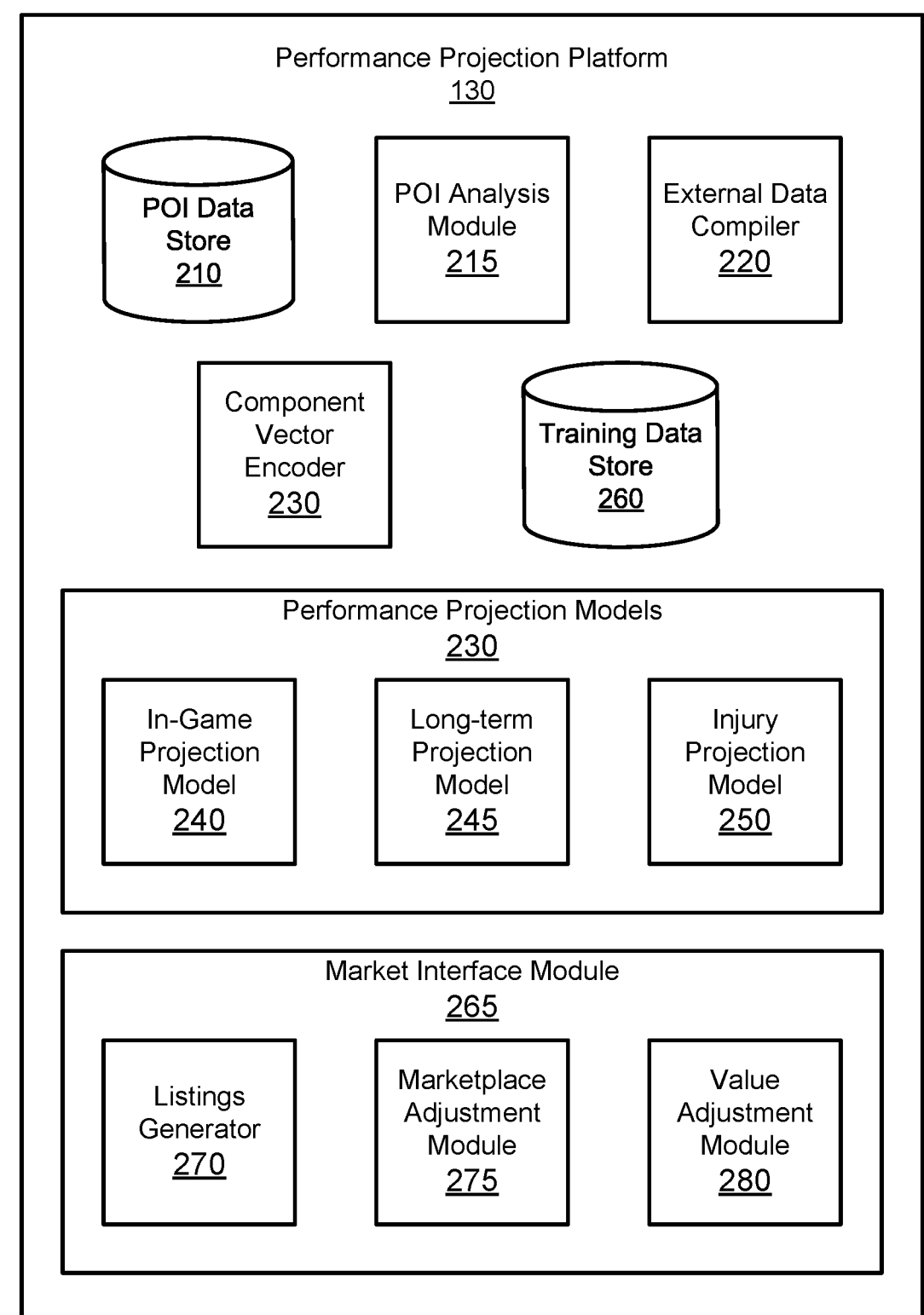
FIG. 2 is a block diagram of the system architecture of the career projection platform 130, according to an embodiment.

FIG. 2 is block diagram of the system architecture of the performance projection platform 130, according to an embodiment. The performance projection platform 130 illustrated in FIG. 2 includes a POI data store 210, a POI analysis module 215, an external data compiler 220, a component vector encoder 225, performance projection models 230, a training data store 260, and a market interface module 265. However, in other embodiments, the performance projection platform 130 may include different and/or additional components.

The POI data store 210 maintains a record of persons of interest across various events and performance data and historical performance metrics determined for each POI. The POI analysis module 215 extracts attributes of the POI from previously stored performance data and/or third-party servers and the extracted data is stored in the POI data store 210 in association with the POI itself. In one embodiment, the POI data store 210 is organized into lookup tables for mapping particular POIs to the performance data recorded for the POI.

Performance data considered by the performance projection platform 130 to predict performance metrics for the POI refers to a combination of intrinsic data including attributes of the POI and external data including attributes of a team corresponding to the POI and inherent properties of the event that the POI participates in. Continuing from the implementation where a POI is an athlete, attributes of the POI describe particular traits of the POI, for example their health, physical condition, age. Attributes of the POI may also characterize their contribution to a team or their impact on a team, for example position played, usage rate, experience competing in the event, and historical performance statistics. Attributes of the team corresponding to the POI characterize the team, for example the number of players on the team, the number of players playing the same position as the POI, the success of the team relative to other teams in the league, the coach and their coaching philosophies. Inherent properties of the event characterize the event itself, for example the number of players permitted on roster, permitted to play at the same time, and rules affecting player rotations and how the event is played.

For a given POI, the POI analysis module 215 compiles intrinsic data for the POI and extracts attributes of the POI from the compiled data. As discussed above, intrinsic data refers to attributes specific to the POI themselves including, for example their role on the team. Where the POI is an athlete, the POI analysis module 215 determines the position played by the POI. Based on the position played by the POI, the POI analysis module 215 may extract different attributes relevant to the performance of a player at their position. For example, in basketball, the performance of a point guard is evaluated based on a different set of attributes or metrics than the performance of a center. Where the POI is a point guard on a basketball team, the POI analysis module 215 may extract an attribute representing the POI's turnover to assist ratio. In comparison, where the POI is a center, the POI analysis module 215 may extract an attribute representing the POI's blocks per game. As another example, in football the performance of a quarterback is evaluated based on a different set of attributes or metrics than the performance of a wide receiver. Where the POI is a quarterback, the POI analysis module 215 may extract an attribute representing the POI's third down conversion percentage. In comparison, where the POI is a wide receiver, the POI analysis module 215 may extract an attribute representing the POI's target to reception ratio. Accordingly, the POI analysis module 215 may determine the position or role of the POI on their team and apply that information as a starting point for extracting additional intrinsic data and external data for the POI. A person having ordinary skill in the art would appreciate that the examples described above are intended to be illustrative and that the position of a POI may be applied to identify any combination of relevant or pertinent attributes of the POI.

In addition, the POI analysis module 215 may determine attributes characterizing the historical performance of the POI during preceding events or preceding time periods. The POI analysis module 215 may review previous events that the POI was scheduled to participate in to determine confirm whether the POI participated in the scheduled event or the frequency with which they participated in scheduled events. Where a POI did participate in a series of events, the POI analysis module 215 may determine whether the POI was injured during the series of events or whether they were held out of the series. Where a POI does not participate due to injury, the injury projection model 250 (further discussed below) generates a prediction of the effect of the injury on the player's career performance.

Alternatively, where the POI was healthy but did not participate in a particular event, the POI analysis module 215 reviews events preceding the particular event to determine whether the POI's exclusion is a trend representative of their role on the team. Accordingly, the POI analysis module 215 analyzes the POI's performance history to determine whether they were excluded from a threshold number of preceding events. If so, the POI analysis module 215 generates a novel attribute or updates an existing attribute describing the POI's reduced usage.

Across multiple years, if a POI is consistently unable to participate in an entire season or consistently misses a particular number of events due to injury or any other recurring reason, the POI analysis module 215 may generate an attribute representing the likelihood that the POI will only participate in a limited number of events and the career projection modules 230 may scale their predicted performance metrics according to the limited number of games.

On a more granular level, the POI analysis module 215 may review a POI's participation in a series of events to determine whether their minutes per game have increased or decreased over that series of events. Accordingly, the POI analysis module 215 may generate or update the attribute describing the increased or decreased usage of the POI based on the trend in their minutes per game. Additionally, the POI analysis module 215 may evaluate the usage of athletes such as football or basketball players based on the number of possessions they participated in during an event. An increase in the number of possessions they participated in may reflect an increase in the POI's usage on the team.

For a POI beginning their career, the POI analysis module 215 may identify the draft position of the POI. When a POI begins their career, insufficient performance data may be available in the POI data store or third-party servers for the performance projection models 230 (further discussed below) to generate live projections or long-term projections for the POI based on the POI's performance data alone. Accordingly, the POI analysis module 215 may identify one or more secondary players sharing a threshold amount of attributes with the POI, for example players who were previously drafted at the same position as the POI, were historically ranked similarly to the POI during or prior to their rookie years, played the same position as the POI, played on a similar team as the current POI, had comparable performances or statistics during previous years, or any combination of such relevant attributes. The POI analysis module 215 may supplement the performance data available to the POI with historical performance data recorded for such secondary players to the POI. The POI analysis module 215 may extract attributes of the POI from the supplemented performance data. Accordingly, and as will be discussed further below, the career projection module 230 may generate a prediction of the POI's career statistics based on the historical performance of secondary players identified by the POI analysis module 215.

In some embodiments, the POI analysis module 215 models a trajectory of the career of a POI and identifies one or more secondary players who historically experienced a similar trajectory. Accordingly, the POI analysis module 215 may supplement intrinsic data collected for the POI with intrinsic data of the identified secondary players and the performance projection models 230 may predict performance statistics of the POI based on the historical trajectories and careers of the identified secondary players.

Additionally, the POI analysis module 215 may generate intrinsic data for the POI based on current events affecting the POI. For example, if the POI is eligible for increased compensation in the coming year (e.g., a new contract or a promotion), the POI analysis module 215 may generate an attribute representing the eligibility of the POI because POI's eligible for increased compensation are correlated with improved performance metrics during their current season. In addition, the POI analysis module 215 may identify one or more secondary players and generate an attribute predicting the POI's increased compensation based on compensation trends among the identified secondary players.

The POI analysis module 215 may additionally correlate the performance of a POI with a news stories or real-world updates regarding the POI. For example, if the POI is expected to change teams in the near future through a trade or a free agent signing, the POI analysis module 215 may generate attributes describing the likelihood that they move to a new team, and which teams the POI is anticipated to move to so that the external data compiler 220 and the career projection modules 230 may generate predictions based on the POI's anticipated team(s).

In some embodiments, the POI analysis module 215 extracts and/or updates biometric data associated with the POI based on available video recordings or images of the POI. Upon receiving an image or video of a POI, the POI analysis module 215 applies computer vision techniques, for example optical character recognition and image analysis techniques, to extract intrinsic attributes from visual features of the POI. Examples of such intrinsic attributes include, but are not limited to, the height, weight, speed, body composition, and other physical characteristics of the POI. In implementations where values of intrinsic attributes extracted by the POI analysis module 215 differ from the values stored in the POI data store 210, the POI data store updates the recorded values if the video or image was made available after the records in the POI data store 210 was last updated.

In some implementations, the POI analysis module 215 may compile intrinsic data from various remote, third-party servers 120 to supplement performance data stored in the POI data store 210. In implementations where relevant attributes for a POI are not stored in the POI data store or insufficient data is stored for the POI in the data store 210, for example the POI has not yet participated in an event or a particular attribute of the POI has not been compiled or generated yet, the POI analysis module 215 may compile intrinsic data from various remote, third-party servers 120. The POI analysis module 330 may implement web scraping techniques to search through third-party remote servers for intrinsic data pertinent to the performance of the POI. In compiling data from third-party servers, the POI analysis module 214 may query databases of information stored across third-party servers for intrinsic data relevant to the POI.

When compiling intrinsic data for the POI, the POI analysis module 215 queries the POI data store 210 to determine whether the intrinsic data available for the POI in the data store 210 satisfies a threshold amount of external data. In one embodiment, the POI analysis module 215 determines the threshold amount of data based on error metrics determined based on the performance of the career projection modules 320, for example the instances where the projections predicted for a POI different from their actual performance. If the available intrinsic data satisfies the threshold, the POI analysis module 215 transmits the intrinsic data to the component vector encoder 225, which generates one or more principal components of the POI and encodes a principal component vector from the one or more principal components. In some embodiments, the POI analysis module 215 implements multiple thresholds and categorizes the compiled intrinsic data based on the threshold satisfied by the compiled intrinsic data.

In some implementations the available intrinsic data does not satisfy the threshold. For example, at the start of their rookie season, intrinsic data for a POI will be unavailable given that the POI has yet to begin playing or that the player has not yet played enough games to have collected sufficient data. In such embodiments, the POI analysis module 215 accesses webpages known to contain or previously labeled as containing intrinsic data pertinent to the POI or the general event associated with the POI participates and queries third-party servers associated with the webpages, for example using the web-scraping techniques discussed above, to extract additional intrinsic data recorded during a time (or range of time) preceding the present time. Continuing from the illustrative embodiment of a basketball point guard, the POI analysis module 215 may search through webpages involving the POI's most recent statistical performances or the current health of the POI. Continuing from the example of a POI in their rookie season, the POI analysis module 215 may access intrinsic data for rookie players from previous years who were drafted at the same position, played the same position, had comparable performances during their rookie seasons, or a combination thereof.

The POI analysis module 215 aggregates any intrinsic data identified at the third-party servers with the currently available intrinsic data and, again, compares the updated intrinsic data to the threshold amount of intrinsic data. If the updated intrinsic data now satisfies the threshold amount of intrinsic data, the POI analysis module 215 transmits the intrinsic data to the component vector encoder 225.

If the amount of available intrinsic data still does not satisfy the threshold amount of intrinsic data, the intrinsic data compiler 330 may query third-party servers for historical intrinsic data associated with the POI at an earlier time period. For example, when a POI is injured the POI analysis module 215 may be unable to compile intrinsic data collected over the past week. Accordingly, the POI analysis module 215 may search the POI data store 210 and third-party remote servers for intrinsic data collected for POI at times prior to the past week. The POI analysis module 215 may transmit the intrinsic data from the prior times to the component vector encoder 340 to generate principal components of the asset.

In some embodiments, the POI analysis module 215 may apply the techniques discussed above for aggregating intrinsic data to satisfy the threshold amount of intrinsic data in a cascading, sequential manner (e.g., querying third-party servers for intrinsic data assigned to the POI before querying servers for intrinsic data assigned to secondary player). In other embodiments, the POI analysis module 215 may apply the techniques discussed above in parallel to maximize the volume of intrinsic data available to the component vector encoder.

The external data compiler 220 may extract and/or compile external data describing contextual circumstances or conditions affecting the performance of a POI, for example their coach, the coaching philosophy of the coach, the quality of other players on the team, the overall quality and performance of the team, end-of season expectations for the team, or any other suitable circumstance, condition, or combination thereof. The external data compiler 220 may implement the techniques and processes described above to extract and compile external data for a POI from third-party remote servers or the POI data store 210.

In one embodiment, the external data compiler 220 identifies teammates of the POI based on information stored in the POI data store 210 or a third-party remote server. Based on the identified teammates, the external data compiler 220 extracts data describing the composition of the team. For example, where the POI is a quarterback on a football team, the external data compiler 220 may identify the number of other quarterbacks on the team as well as the depth chart. The external data compiler 220 may evaluate the playing time, usage, and/or overall value of a POI based on the number of players competing for the position of the POI and the hierarchy of the players at the position (as described in the depth chart).

The external data compiler 220 may additionally extract attributes describing the quality and/or performance of individual players on the team, which may be determined using the techniques discussed above with reference to the POI analysis module 215. For a POI on a team with several more effective players, the performance projection models 230 may predict lower performance metrics due to lessened playing time. In comparison, for a POI who is the most effective player on their team, the performance projection models 230 may predict higher performance metrics due to lessened playing time and the team's increased focus on the POI.

The external data compiler 220 may consider attributes of individual players on the team on a more granular level than an overall performance statistic. For example, on a basketball team of players who emphasize scoring, the performance projection models 230 may determine improved performance metrics for a POI who emphasizes rebounds and assists. The external data compiler 220 may additionally consider the overall performance of the team, for example whether the team is projected to make or miss the playoffs based on the performance of the POI and other individual team players. Where a POI plays a consistent role on the team and the team is projected to make the playoffs, the performance projection models 230 may predict higher performance metrics for the POI compared to a POI on a team that is not projected to make the playoffs or a playoff team where the POI does not have a consistent role.

In addition to attributes of players on a team, the external data compiler 220 may extract attributes of the coach, coaching staff, or supervisors of the team. For example, the coach or coaching staff may encourage formations, defenses, offenses, or strategies (e.g., plays per possession or an emphasis on rushing yards over passing yards in football) that cause particular players or positions to be utilized or emphasized over other players or positions. Accordingly, depending on the coaching staff and their preferences, the performance metrics predicted by the career projection modules 230 may increase or decrease for a particular POI. To extract attributes of a coach or coaching staff, the external data compiler 220 may query the POI data store or third-party remote servers to evaluate the performances and trends of a coach's team during the current season or historical season. For coaches in their first season or those for whom insufficient data can be extracted, the external data compiler 220 may implement the techniques and process described above to identify secondary coaches and extract data associated with the secondary coaches. Alternatively, or in addition, the external data compiler 220 may extract data associated with other coaches on the coaching staff to generate attributes characterizing a head coach's preferences and strategy.

Even beyond an individual POI, their team, and coaching staff, the external data compiler 220 may extract attributes including macrolevel information that affects the performance metrics of a particular POI or type of POI (e.g., certain position or type of position). Such macrolevel information may describe general trends in the event itself. For example, a macrolevel trend in football emphasizing rushing on third-down over passing on third-down would impact the performance metrics of a wide receiver on third down. As another example, a macrolevel trend in basketball favoring three-point shooting when a team is losing in the fourth quarter may impact the performance metrics of a center in the fourth quarter. Accordingly, the external data compiler 220 may generate attributes characterizing macrolevel trends in an event in which the POI participates.

The external data compiler 220 compiles inherent properties of an event that the POI participates in, which govern how the POI may act while participating. For example, in basketball a team may have a maximum of five players on the court, so the performance projection models 230 may scale or adjust the predicted performance metrics for a POI based on the number of people sharing the court with them. Described differently, inherent properties of an event refer to the rules within which a POI may participate in the event and a coach may instruct their players to participate in the event.

Consistent with the description above regarding the POI analysis module 215, when the external data compiler 220 compiles sufficient external data for a POI to satisfy a threshold amount of external data, the external data compiler 220 transmits attributes extracted from the external data to the component vector encoder to generate component vectors of the POI.

As discussed above, predictions for performance metrics of a POI fluctuate over time, increasing or decreasing in response to changes in the circumstances and context surrounding the POI, their team, their coaches, and their event. For example, the year a POI contends for the Most Valuable Player award, performance metric predictions for the POI will increase. Alternatively, the year a POI suffers an injury, performance metric predictions for the POI will decrease. Accordingly, the POI analysis module 215 extracts attributes from intrinsic data of the POI and the external data compiler 220 extracts attributes from external data of the POI to predict performance metrics of the POI at a present time.

The component vector encoder 340 receives attributes extracted by the POI analysis module 215 from intrinsic data and attributes extracted by the external data compiler 220 from external data to generate a component vector of the POI. A component vector is a representation of the performance data (e.g., a feature vector) collected for a POI during a present time, which may be processed by a machine learning model to predict performance metrics of the asset during a particular event or time period. As described herein, such a feature vector is referred to as a "component vector." To that end, the component vector encoder 225 analyzes external data and intrinsic data to generate principal components of the POI, which comprise component vector.

"Principal components" describe variables (e.g., attributes extracted from intrinsic data and external data compiled for an asset) to be input to a machine learning model, for example the performance projection models 230 discussed below, to predict performance metrics for a POI. Described differently, principal components are numerical representations of the various inputs that the models 230 process to output performance metrics for a POI for a given event or time period. Each feature of the principal component vector represents a principal component of the asset, which may be determined based on attributes extracted from intrinsic data and external data.

The principal component vector is input to a performance projection model 230 (e.g., the in-game projection model 240, the long-term projection model 245, or the injury projection model 250), which outputs a performance metrics of the POI corresponding to a present time or time period. The machine-learning models 230 are trained based on a training dataset including a population of POIs and, for each POI of the training dataset, an aggregation of principal components as labeled by a historical performance metric and a time associated with the entry. During training, the performance projection models 230 derives parameter values of the models 230.

Particular attributes of performance data may themselves be principal components of a component vector. For example, the component vector encoder 225 may identify intrinsic data such as the position of the POI, the age of the POI, and the height of the POI as principal components.

The component vector encoder 225 may additionally generate a principal component modeling a trajectory of performance metrics for the POI based on available performance data collected for the POI. To model the trajectory, the component vector encoder 225 tracks fluctuations in historically predicted performance metrics of the POI over a time period and based on performance data gather during the time period. In addition, the component vector encoder 225 draws correlations between the historically predicted performance metrics and attributes extracted from performance data collected during the time period. Accordingly, the component vector encoder 340 generates principal components of the POI based on the correlations between attributes describing the performance of the POI, their health, the health and performance of their team, and macro-level circumstances and actual performance metrics of the POI measured during the time period. Using principal components extracted from such trajectory models, the performance projection models 230 may predict performance metrics for a POI at a present time or time period based on performance data compiled for a present time or time period.

In addition, the component vector encoder 225 may assign weights to performance data collected from historical time periods preceding the present event or time period to assign a increase the predictive value of more recently collected external data. Accordingly, the performance metrics predicted for a player in their $17^{th}$ season may be more significantly impacted or correlated with the performance metrics measured during their $16^{th}$ season compared to performance metrics measured during their rookie season. As another example, performance metrics predicted for a player in their second season returning from an injury may be more significantly correlated with the performance metrics measured during their first season returning from the injury compared to performance metrics predicted for the player before the injury.

As described above, the performance projection models 230 apply machine learning techniques to predict performance metrics for a POI based on a combination of intrinsic data and external data compiled for the POI. In particular, the performance projection models 230 comprise an in-game projection model 240, a long-term projection model 245, and an injury projection model 250. However, in other embodiments, the performance projection models 230 may include different and/or additional components. For example, the functionality of the injury projection model 250 may be integrated into either the in-game projection model 240, the long-term projection model 245, or both. In some embodiments, the performance projection models 230 comprise individual models trained to generate performance metric predictions for individual events (e.g., basketball, football, baseball) and/or individual positions within those events (e.g., point guard, quarterback, pitcher).

To predict performance metrics of a POI during a current event or a present time period, the performance projection models 230 may be a mathematical function or other more complex logical structure, trained using a combination of intrinsic and external data stored in the training data store 260 to determine a set of parameter values stored in advance and used as part of the prediction analysis. As described herein, the term "model" refers to the result of the machine learning training process. In one embodiment, the performance projection models 230 are gradient-boosted decision trees. Alternatively, the performance projection models 230 may implement other machine learning techniques including, but not limited to, linear regression, decision trees, support vector machines, classifiers (e.g., a Naïve Bayes classifier), fuzzy matching, and gradient boosting. Specifically, the performance projection models 230 describe functions for predicting performance metrics of a POI and the determined parameter values incorporated into each function. "Parameter values" describe the weight associated with at least one of the featured principal components.

Each of the performance projection models 230 are trained using a training dataset made up of large volumes of historical extrinsic data and intrinsic data recorded for a significant volume of assets. Each entry of the training dataset, stored in the training data store 260, represents a POI labeled with a known performance metric, which may also be referred to as a "prediction label." An entry in the training data store 260 further includes a unique identifier of the POI mapped to time at which the prediction label was recorded, and a combination of principle components encoded by the component vector 225 that contributed to the known prediction label. An entry in the training data store 260 may further include intrinsic data compiled for the POI corresponding to the entry and/or external data that contributed to the prediction label of the POI during the event or time period. Accordingly, the training data store 355 includes labeled training data (e.g., prediction labels) corresponding to the same POIU at various times and similar, secondary players at different times. Although not illustrated in FIG. 2, the training data store 260 may store separate training datasets for each performance projection model 230—a training dataset for the in-game projection model 240, a training dataset for the long-term projection module 245, and a training dataset for the injury projection model 250. During training, each performance projection model 230 determines parameter values for each principal component input to the model 230 by analyzing and recognizing correlations between the principal components associated with an entry and the labeled prediction of the entry.

As predictions are confirmed by manually recorded performance metrics, the training data store 260 may be updated with entries regarding performance metrics of a POI at recently occurring events or time periods. Accordingly, the performance projection models 230 may be iteratively trained based on the updated data in the training data store

355 to continuously improve the accuracy of predictions generated by the performance projection models 230. By iteratively training the performance projection models 230 based on the principal components of updated entries in the training data, the models 230 continue to learn and refine their parameter values based on new and updated data points. Iteratively re-training the performance projection models 230 in the manner discussed above allows the models 230 to more accurately predict performance metrics for a POI based on the principal components generated for the POI.

The in-game projection model 240 outputs a prediction of a performance metric characterizing the performance of a POI during a current event. As described herein, the performance metric output by the in-game projection model 240 is referred to as a "live metric." The in-game projection model 240 may be implemented to generate a real-time prediction of a performance metric as a POI participates in an on-going current event. To determine a live metric by the in-game projection model 240, the component vector encoder 340 generates a live component vector based on attributes extracted from intrinsic data and external data compiled for the POI during or immediately preceding the current event. As described above, the POI analysis module 215 and the external data compiler 220 may compile intrinsic data and external data by querying data stored at the POI data store 210 and/or third-party remote servers for the POI and/or secondary players. Consistent with the above description of the training data store 260, the in-game projection model 240 is trained based on a training dataset where each entry in the training dataset represents the performance of a POI during a given event. Accordingly, each entry in the training dataset comprises attributes extracted from intrinsic data of a POI and external data of the POI (e.g., attributes of the team corresponding to the POI and inherent properties of the event that the POI participates in) and is labeled with the identify of the POI, a timestamp for the given event, and a known live metric characterizing the historical performance of the player during the given event.

In one embodiment, the in-game projection model 240 generates a live metric that is a value representing an impact of the POI on a current event relative to an impact of a secondary player on the current event. In such an embodiment, the live metric may be referred to as "wins above replacement." Accordingly, such a live metric represents a measure of a POI's contribution to the current event by considering the number of wins that can be attributed to the POI over a secondary player (e.g., a replacement player at the same position as the POI). In some embodiments, the in-game projection model 240 may be tuned (e.g., a user of the user computing device 110) to predict a live metric for a particular performance metric depending on the current event. For example, where the current event is a basketball game, the in-game projection model 240 may be tuned to predict a live metric describing points scored, points allowed, rebounds, assists, blocks, or any other suitable performance metric. As another example, where the current event is a football game, the in-game projection model 240 may be tuned to predict a live metric describing touchdowns scored, touchdowns allowed, passer ratings, competition percentages, target to reception ratios, yards per carry, or any other suitable performance metric.

In some embodiments, the in-game projection model 240 continuously predicts live metrics for a POI for the duration of an event. In such embodiments, the POI analysis module 215 and the external data compiler 220 continuously compile performance data for the POI reflecting real-time updates occurring at the event. Similarly, based on the continuously compiled performance data, the component vector encoder 225 continuously generates live component vectors and the in-game projection model 240 continues to determine live metrics based on the live component vectors.

At the conclusion of a current event, the POI analysis module 215 and the external data compiler 220 extract actual performance metrics for the POI from third-party remote servers and store the actual performance metrics in the POI data store. The in-game projection model 240 compares the live metrics predicted throughout the current event to the actual metrics measured during the current event to normalize each predicted live metric according to the actual performance of the POI. Accordingly, at the conclusion of a current event, the in-game projection model 240 may be iteratively re-trained based on the actual performance metrics to improve the accuracy of predictions generated during a subsequent event.

The long-term projection model 245 outputs a prediction of a performance metric characterizing the performance of a POI during a time period, for example a period spanning multiple weeks or a player's entire career. As described herein, the performance metric output by the long-term projection model 245 is referred to as a "career metric." The long-term projection model 245 may be implemented to generate a prediction of a performance metric of the POI as the POI participates in events over an extended time period. To determine a career metric by the long-term projection model 245, the component vector encoder 225 generates a career component vector based on attributes extracted from intrinsic data and external data compiled for the POI during a particular time period. The component vector encoder 225 may additionally encode live metrics generated during events within the time period, so that the long-term projection model 245 predicts long-term performance metrics based on the most recent performances of a POI. In some embodiments, the component vector encoder 225 includes the most recently predicted live metric in the career component vector. In other embodiments, the component vector encoder 225 accesses a threshold number of the mostly recently predicted live metrics to be incorporated into the career component vector.

As described above, the POI analysis module 215 and the external data compiler 220 may compile intrinsic data and external data by querying data stored at the POI data store 210 and/or third-party remote servers for the POI and secondary players. Consistent with the description of the training data store 260, long-term projection model 245 is trained based on a training dataset where each entry in the training dataset represents the performance of a POI during a given event. Accordingly, each entry in the training dataset comprises attributes extracted from intrinsic data of a POI and external data of the POI (e.g., attributes of the team corresponding to the POI and inherent properties of the event that the POI participates in) and is labeled with the identity of the POI, a time period when the entry was recorded, and a known career metric characterizing the overall performance of the player during the time period.

In one embodiment, the long-term projection model 240 generates a career metric that is a value representing an impact of the POI during the relevant time period relative to an impact of a secondary player during the same time period. In such an embodiment, the live metric may be referred to as "long-term wins against replacement." Accordingly, such a career metric represents a measure of a POI's contribution during a time period by considering the number of wins that can be attributed to the POI over a secondary player (e.g., a replacement player at the same position as the POI). In some embodiments, the long-term projection model 245 may be tuned (e.g., a user of the user computing device 110) to predict a live career for a particular performance metric depending on the current event as discussed above with the in-game projection model 240.

The long-term projection model 245 may generate long-term performance metric predictions in response to a change in the projections generated by the model 240. Additionally, the long-term projection model 245 may generate long-term performance metric predictions in response to a variety of triggering events including, but not limited to, the conclusion of a time period, a benchmark in the career or performance of the POI (e.g., a player award), the conclusion of a season/year, a request from a user operating a user computing device 110, or any other suitable trigger condition. The long-term projection model 245 is iterative re-trained based on actual metrics measured during the time period to improve the accuracy of predictions generated during a subsequent time period. In some embodiments, after the generation of career metric for a time period, the component vector encoder additionally includes the career metric when generating a live component vector for a current event occurring during a subsequent time period. The live component vector is input to the in-game projection model 240 to determine a live metric characterizing the performance of the POI for the current event during the subsequent time period.

The injury protection model 250 outputs an injury prediction characterizing an impact of an injury on the POI during a time period. When the POI analysis module 215 extracts an attribute from intrinsic data describing that the POI is injured, the injury projection model 250 determines a projected impact of the injury on the live and long-term performance metrics of the player. As described herein, the injury projection by the injury protection model 250 is referred to as an "injury prediction."

To determine an injury prediction by the injury projection model 250, the component vector encoder 225 generates an injury component vector based on the attributes extracted from internal and extrinsic data of the POI and/or attributes of secondary players historically affected by the injury. As described above, the POI analysis module 215 and the external data compiler 220 may compile intrinsic data and external data by querying data stored at the POI data store 210 and/or third-party remote servers for the POI and secondary players. Where a POI has suffered the same or a comparable injury before, the injury projection model 250 may generate an injury prediction based on the historical impact of the injury on the player's performance metrics. Where a POI has not suffered the same or a comparable injury before, the injury projection model may predict the impact of the injury by identifying secondary players who have historically suffered the same injury and the impact of the injury on the performance metrics of the secondary players.

Consistent with the description of the training data store 260, injury projection model 250 is trained based on a training dataset where each entry in the training dataset represents the performance of a POI during a given event. Accordingly, each entry in the training dataset comprises attributes extracted from intrinsic data of a POI or secondary player historically effected by the injury and labeled with an effect of the injury on the historically affected POI.

In one embodiment, the injury projection model 250 generates an injury prediction that is a numerical value or verbal characterization of the impact of the injury on the POI's performance metrics. For example, the injury prediction may describe a predicted number of event that the POI will miss during a time period time due to the injury, an effect of the injury on performances of the POI during events occurring within or after the time period, any other relevant insights regarding the impact of the injury, or a combination thereof. From an injury prediction generated by the injury projection model 250, the POI analysis module 210 extracts an attribute characterizing the impact of the injury and transmits the attribute to the component vector encoder 225. The component vector encoder 225 includes the attribute in subsequent live component vectors, career component vectors, or both. Accordingly, live metrics predicted by the in-game projection model 240 and career metrics predicted by the long-term projection model 245 account for the injury to the POI.

In some embodiments, the injury projection model 250 may additionally be trained to predict a likelihood that a POI will suffer an injury based on a combination of intrinsic data of the POI and external data compiled based on secondary players who have suffered an injury. For example, baseball pitchers pitching at a particular speed and with a particular form may be more susceptible to Tommy John injuries. In such embodiments, the injury projection model 250 is trained based on a training dataset where each entry comprises attributes of a secondary player who suffered an injury and label identifying the injury and the point in their career the injury occurred. Consistent with the techniques described above, the injury projection model 250 may apply computer vision techniques, for example optical character recognition and image analysis techniques, to images and videos of a POI'S movements to extract attributes characterizing their likelihood of suffering an injury.

The market interface module 265 generates listings for a POI or a combination of POIs based on the live and career metrics generated by the performance projection models. The market interface module 265 illustrated in FIG. 2 includes a listings generator 270, a marketplace adjustment module 275, and a value adjustment module 280. However, in other embodiments, the performance projection platform 130 may include different and/or additional components.

The listings generator 270 may assign performance metrics predicted by the performance projection modules 235 to listings of a POI. Accordingly, the listings generator 270 may determine value of a listing based on the assigned performance metrics. For example, a user may sponsor a listing that a baseball player will hit 100 home runs in a season for the cost of $100. In addition to listings generated based on predicted performance metrics themselves, the listings generator 270 may generate listings based on the decisions of a persons of interest, for example players, coaches, and general management, that are influenced by predicted performance metrics. For example, a listing may be based around the likelihood that a POI changes a team mid-season or at the end of the season, that a player is moved to a bench role or a starting role, or that a coach is replaced mid-season or at the end of the season.

The market interface module 265 generates and transmits graphical user interfaces to user computing devices 110. When the performance projection platform 130 generates and transmits a graphical user interface, hereafter referred to as a "market dashboard," which is displayed on a screen a screen of a user computing device 110. The market dashboard displays the listing of a POI with the predicted performance metrics and with an identifier for the POI. The market dashboard may additionally include a selectable graphical element enabling the provider to sponsor, acquire, approve, reject, or modify the listing. The marketplace adjustment module 275 determines which POI's and their corresponding listings appear in the market dashboard.

The value adjustment module 275 may increase value of a listing as the predicted performance metrics begin to deviate from a player's actual performance metrics. In some embodiments, the value adjustment module 275 may decrease the value of a listing as it becomes less likely that a POI will achieve the predicted performance metrics assigned to the listing. Accordingly, the value of a listing may represent an award given to the user sponsoring the listing if the POI outperforms the predicted performance metric. In some embodiments, multiple users may sponsor a listing or individual users may sponsor a listing in part. In some embodiments, the market interface module 265 awards a sponsoring user incrementally as the POI progresses towards achieving the predicted performance metric. Continuing form the example above, for each home run the baseball player hits during the season, a user sponsoring the listing may be awarded $1.

In some embodiments, the value adjustment module 275 adjusts the value of a listing based on user activity within the marketplace or the market dashboard. For example, the value adjustment module 275 increase the value of a listing as the number of users sponsoring the listing increases. The value adjustment module 275 determines an amount by which to increase or decrease the value of a listing based on the number of users of users sponsoring the listing and the value with which individual users sponsor the listing. The value adjustment module 275 may additionally consider the uncertainty of the predictions generated by the performance projection models 230. For example, the models 230 may report a higher uncertainty in their prediction if a POI recently suffered an injury with no prognosis, if a POI has limited available performance data, or if real-time performance data for POI is pending official review. In such instances, if the uncertainty reported by a model 230 exceeds a threshold uncertainty, the marketplace adjustment module 230 may temporarily suspend the listing from being displayed on the market dashboard.

FIG. 3 is an exemplary data flow for determining a metric characterizing the performance of a person of interest during a current event, according to an embodiment. The performance projection platform 130 identifies 305 a player of interest (POI) and an event that the POI participates in. As described throughout the specification, a POI may be an athlete, an employee or any member of a team. An event may be a sport, a job, or any task that must be executed by the POI or their team. The performance projection platform 130 extracts 310 attributes of the POI from intrinsic data compiled for the POI. Such attributes characterize the POI themselves and their inherent abilities or traits. Additionally, the performance projection platform 130 extracts 310 attributes of the POI's team from external data compiled for the POI's team such as the overall performance of the team, individual performances of teammates, the quality of the coach, and the strategies implemented by the coaching staff. Further the performance projection platform 130 extracts 310 inherent properties of the event, for example rules and regulations that govern the POI's ability to perform at the event. Where insufficient intrinsic data is available for a POI, the performance projection platform 130 may identify one or more secondary assets sharing a threshold amount of attributes with the POI. Using any combination of the techniques discussed above, the performance projection platform 130 may supplement performance data compiled for the POI with performance data and attributes of the secondary players. Where applicable, the performance projection platform 130 may implement the injury projection model 250 described above with regards to FIG. 2 and below with regards to FIG. 6 to generate an attribute predicting an impact of an injury on a player's performance.

The performance projection platform 130 generates 315 a live component vector based on the extracted attributes of the POI and their team and the inherent properties of the event. The performance projection platform 130 inputs 320 the live component vector in a machine-learning model, for example the in-game projection model 240 to predict a live metric characterizing the performance of the POI during a current event. The live metric may be any suitable measure of the performance of a POI, for example a "wins against replacement" measurement representing the impact of the POI on their team winning relative to another suitable replacement player. In some embodiments, the performance projection platform normalizes 325 a predicted live metric based on an actual performance of the POI during the current event to improve the accuracy of future live metric predictions generated by the machine-learning model.

Figure 4:
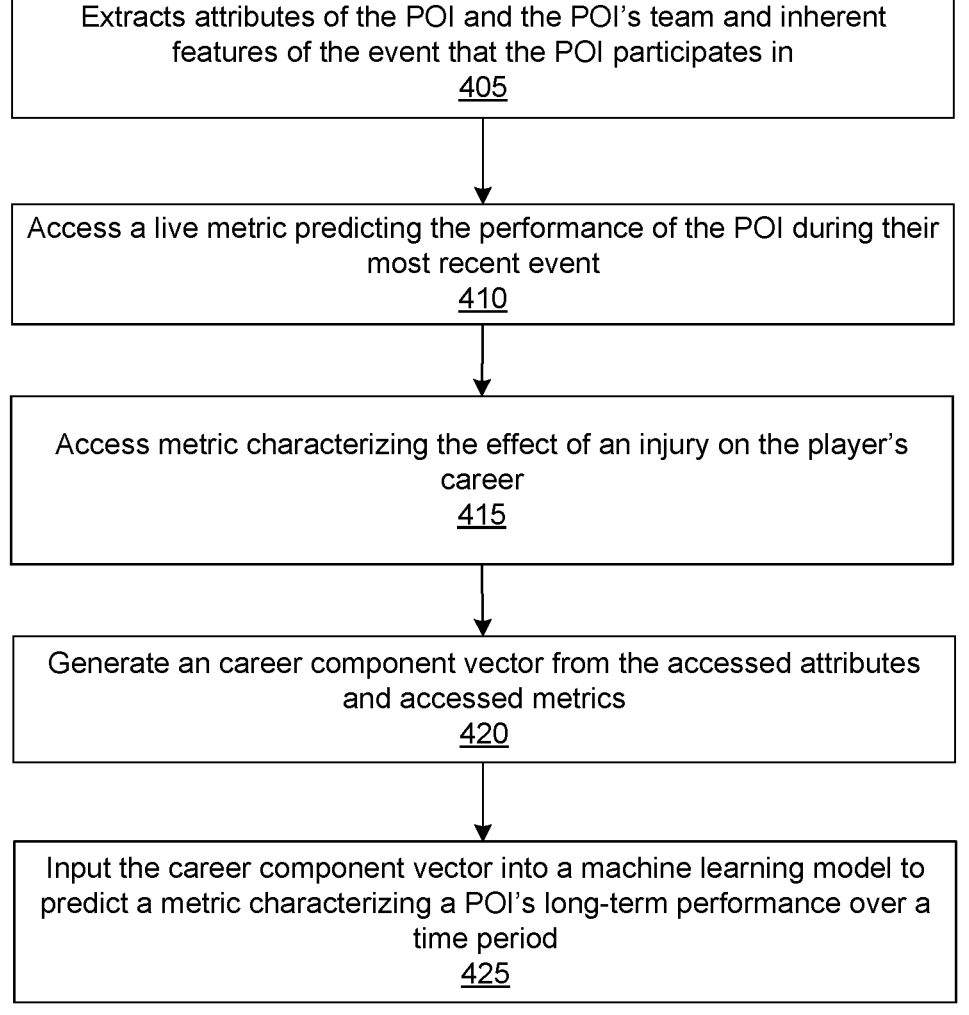
FIG. 4 is an exemplary data flow for determining a metric characterizing the performance of a person of interest during a current event, according to an embodiment.

FIG. 4 is an exemplary data flow for determining a metric characterizing a person of interest's end-of-career performance, according to an embodiment. As described above with respect to FIGS. 2 and 3, the performance projection platform 130 extracts 405 attributes for a POI, attributes from the team of the POI and inherent properties of the event that the POI participates in. In addition, the performance projection platform 130 accesses 410 a live metric predicting the performance of the POI during the most recent they participated in and accesses 415 a metric characterizing the effect of an injury on the POI's career, so that a prediction generated by the performance projection platform 130 reflects both the POI's most recent performances and their most recent health conditions. In some embodiments, the performance projection platform may access and encode multiple live metrics predicted during a time period into the career component vector. Accordingly, the performance projection platform 130 generates 420 a career component vector from the accessed attributes (405) and metrics (410 and 415). The performance projection platform 130 inputs 425 the career component vector into a machine-learning model, for example the long-term projection model 245, to predict a metric characterizing a POI's long-term performance over an extended time period, for example the end of their career or the end of a season.

FIG. 5 is an exemplary data flow for determining a metric characterizing the effect of an injury on the player's career, according to an embodiment. From performance data compile for a POI, the performance projection platform may identify 505 an injury suffered by a POI during a current time period, for example from news articles stored at third-party remote servers. The performance projection platform 130 identifies 510 one or more players with a history of the same injury and extracts 515 one or more attributes from the identified one or more players. The performance projection platform 130 generates 520 an injury component vector from the attributes of the identified one or more secondary players and attributes extracted for the POI. The performance projection platform 130 inputs 525 the injury component vector into a machine learned model to predict a metric characterizing the effect of the injury on the POI's long-term or live performance.

Computing Machine Architecture

Figure 6:
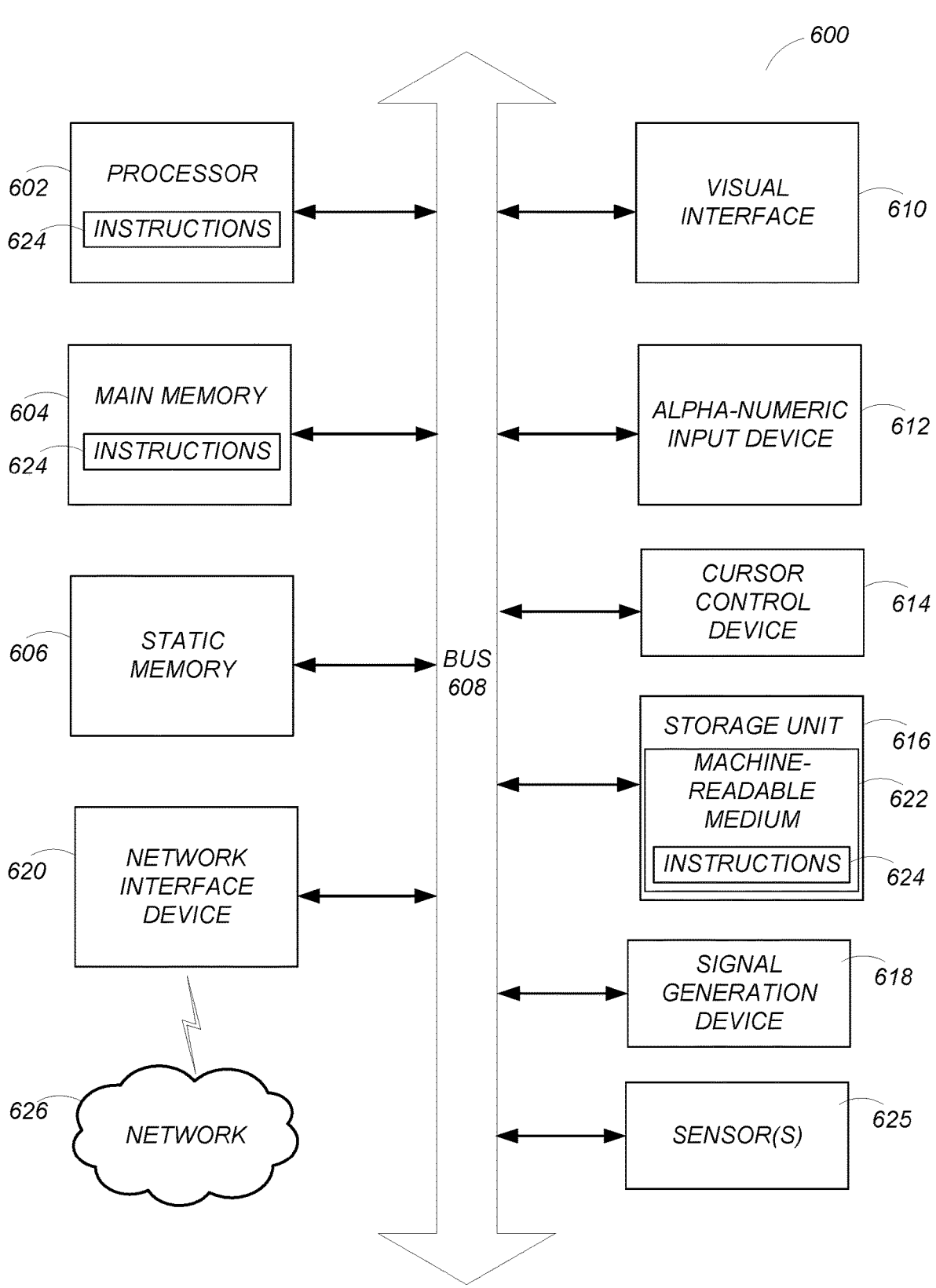
FIG. 6 is an exemplary data flow for determining a metric characterizing a person of interest's end-of-career performance, according to an embodiment.

FIG. 6 is a block diagram illustrating components of an example machine able to read instructions from a machine-readable medium and execute them in a processor (or controller). Specifically, FIG. 6 shows a diagrammatic representation of a machine in the example form of a computer system 600 within which program code (e.g., software) for causing the machine to perform any one or more of the methodologies discussed herein may be executed. The program code may be comprised of instructions 624 executable by one or more processors 602. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 624 (sequential or otherwise) that specify actions to be taken by that machine. Further, while only a single machine is illustrated, the term "machine" shall also be taken to include any collection of machines that individually or jointly execute instructions 624 to perform any one or more of the methodologies discussed herein.

The example computer system 600 includes a processor 602 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 604, and a static memory 606, which are configured to communicate with each other via a bus 608. The computer system 600 may further include visual display interface 610. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 610 may include or may interface with a touch enabled screen. The computer system 600 may also include alphanumeric input device 612 (e.g., a keyboard or touch screen keyboard), a cursor control device 614 (e.g., a mouse, a trackball, a joystick, a motion sensor, or other pointing instrument), a storage unit 616, a signal generation device 618 (e.g., a speaker), and a network interface device 620, which also are configured to communicate via the bus 608.

The storage unit 616 includes a machine-readable medium 622 on which is stored instructions 624 (e.g., software) embodying any one or more of the methodologies or functions described herein. The instructions 624 (e.g., software) may also reside, completely or at least partially, within the main memory 604 or within the processor 600 (e.g., within a processor's cache memory) during execution thereof by the computer system 600, the main memory 604 and the processor 600 also constituting machine-readable media. The instructions 624 (e.g., software) may be transmitted or received over a network 826 via the network interface device 620.

While machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any medium that is capable of storing instructions (e.g., instructions 624) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for predicting claim outcomes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

extracting 1) attributes of a person of interest (POI) from intrinsic data compiled for the POI and 2) attributes of a team corresponding to the POI and inherent properties of an event associated with the POI from external data compiled for the POI;

generating a live component vector comprising the attributes of the POI, the attributes of the team, and the inherent properties of the event;

predicting a live metric characterizing a performance of the POI during a current event by inputting the live component vector into a first machine learning model, wherein the first machine learning model predicts the live metric while the POI is participating in the current event, the first machine learning model iteratively trained using a first training dataset comprising training data, each entry of training data comprising a set of attributes of a player and a corresponding team and labeled with a metric characterizing a historical performance of the player during a given event, wherein the first training dataset is periodically updated with live metrics predicted by the first machine learning model during a preceding time period, and wherein the live metric includes at least a measure of wins above replacement determined by applying the first machine learning model to the POI to produce a first prediction, applying the first machine learning model to a secondary person to produce a second prediction, and comparing the first prediction to the second prediction, wherein the secondary player shares a threshold amount of attributes with the POI;

normalizing the live metric determined by the first machine learning model by comparing the determined live metric to an actual performance of the POI during the current event;

after the current event and each of a set of subsequent events, iteratively re-training the first machine learning model based on a comparison of determined live metrics predicted by the first machine learning and corresponding actual performances of the POI during the current event and each subsequent event;

generating a long-term component vector by updating the live component vector with the normalized live metric; and predicting a long-term metric characterizing the performance of the POI during a time period comprising a plurality of events preceding and following the current event by inputting the long-term component vector into a second machine learning model, wherein the second machine learning model is iteratively trained using a second training dataset comprising training data, each entry of training data comprising a set of attributes of a player, a corresponding team, and historical performances and labeled with a metric characterizing a long-term performance of the player during a time period, wherein the second training dataset is periodically updated with long-term metrics predicted by the first machine learning model during a preceding time period, and wherein the second machine learning model is trained to predict long-term performance based on historical correlations between prediction-error values of the first machine learning model and subsequent player performance outcomes.

2. The method of claim 1, further comprising:

querying a database stored at a remote server to identify intrinsic data comprising attributes of the POI;

determining whether the identified intrinsic data satisfies a threshold amount of data;

responsive to determining than the identified intrinsic data is less than the threshold amount of data, accessing a record of web pages containing external data of the POI;

extracting attributes of the POI from external data stored at each web page listed on the record of web pages during the current event; and generating the live component vector based on the attributes extracted from the external data of the POI.

3. The method of claim 1, further comprising:

querying a database stored at a remote server to identify intrinsic data of the POI;

determining whether the identified intrinsic data satisfies a threshold amount of data;

responsive to determining that the identified intrinsic data is less than the threshold amount of data, identifying one or more secondary players stored in the database, wherein each of the one or more secondary players shares a threshold amount of attributes with the POI;

extracting attributes of the one or more secondary players; and generating the live component vector based on the extracted attributes of the one or more secondary players.

4. The method of claim 1, further comprising:

at a conclusion of the current event, determining the actual performance of the POI during the current event by querying one or more remote servers for data describing the actual performance of the POI; and normalizing the live metric determined by the first machine learning model based on the actual performance of the POI during the current event.

5. The method of claim 1, wherein generating the long-term component vector further comprises:

querying a database stored at a remote server to identify one or more secondary players stored in the database, wherein each of the one or more secondary players shares a threshold amount of attributes with the POI;

extracting attributes of each of the one or more secondary players; and updating the long-term component vector based on the attributes extracted from the one or more secondary players.

6. The method of claim 1, wherein generating the long-term component vector further comprises:

accessing live metrics determined for a plurality of historical events preceding or occurring during the time period; and updating the long-term component vector based on the accessed live metrics, wherein each live metrics is assigned a relative weight based on a time when the live metric was determined.

7. The method of claim 1, further comprising:

responsive to determining the POI suffered an injury, generating an injury component vector comprising the attributes of the POI;

generating an injury prediction characterizing an impact of the injury on the POI during a time period by inputting the injury component vector into a third machine learning model, wherein the third machine learning model is trained using a third training dataset comprising training data, each entry of training data comprising attributes of a POI historically affected by the injury and labeled with an effect of the injury on the historically affected POI; and updating the long-term component vector to include the injury prediction.

8. The method of claim 7, further comprising:

querying a database stored at a remote server to identify one or more secondary players stored in the database, wherein each of the one or more secondary players suffered the injury and shares a threshold amount of attributes with the POI;

extracting attributes from each of the one or more secondary players; and updating the injury component vector based on the attributes extracted from the one or more secondary players.

9. The method of claim 7, wherein the injury prediction describes one or more of the following:

a count of events that the POI will miss during the time period due to the injury; and an effect of the injury on performances of the POI during events occurring within the time period or after the time period.

10. The method of claim 1, wherein the live metric is determined at a first time during the current event, the method further comprising:

generating a second live component vector comprising the attributes of the POI, the attributes of the team, the inherent properties of the event, and the live metric determined for the current event; and determining a second live metric characterizing the performance of the POI at a second time during the current event by inputting the second live component vector into the first machine learning model.

11. A non-transitory computer readable storage medium comprising stored instructions, which when executed by at least one processor, cause the processor to:

extract 1) attributes of a person of interest (POI) from intrinsic data compiled for the POI and 2) attributes of a team corresponding to the POI and inherent properties of an event associated with the POI from external data compiled for the POI;

generate a live component vector comprising the attributes of the POI, the attributes of the team, and inherent properties of the event;

predict a live metric characterizing a performance of the POI during a current event by inputting the live component vector into a first machine learning model, wherein the first machine learning model predicts the live metric while the POI is participating in the current event, wherein the first machine learning model is trained using a first training dataset comprising training data, each entry of training data comprising a set of attributes of a player and a corresponding team and labeled with a metric characterizing a historical performance of the player during a given event, and wherein the live metric includes at least a measure of wins above replacement determined by applying the first machine learning model to the POI to produce a first prediction, applying the first machine learning model to a secondary person to produce a second prediction, and comparing the first prediction to the second prediction, wherein the secondary player shares a threshold amount of attributes with the POI;

normalize the live metric determined by the first machine learning model by comparing the determined live metric to an actual performance of the POI during the current event;

after the current event and each of a set of subsequent events, iteratively re-training the first machine learning model based on a comparison of determined live metrics predicted by the first machine learning and corresponding actual performances of the POI during the current event and each subsequent event;

generate a long-term component vector by updating the live component vector with the normalized live metric; and predict a long-term metric characterizing the performance of the POI during a time period comprising a plurality of events preceding and following the current event by inputting the long-term component vector into a second machine learning model, wherein the second machine learning model is trained using a second training dataset comprising training data, each entry of training data comprising a set of attributes of a player, a corresponding team, and historical performances and labeled with a metric characterizing a long term performance of the player during a time period, and wherein the second machine learning model is trained to predict long-term performance based on historical correlations between prediction-error values of the first machine learning model and subsequent player performance outcomes.

12. The non-transitory computer readable medium of claim 11, further comprising instructions that cause the processor to:

query a database stored at a remote server to identify intrinsic data comprising attributes of the POI;

determine whether the identified intrinsic data satisfies a threshold amount of data;

responsive to determining than the identified intrinsic data is less than the threshold amount of data, access a record of web pages containing external data of the POI;

extract attributes of the POI from external data stored at each web page listed on the record of web pages during the current event; and generate the live component vector based on the attributes extracted from the external data of the POI.

13. The non-transitory computer readable medium of claim 11, further comprising instructions that cause the processor to:

query a database stored at a remote server to identify intrinsic data of the POI;

determine whether the identified intrinsic data satisfies a threshold amount of data;

responsive to determining that the identified intrinsic data is less than the threshold amount of data, identify one or more secondary players stored in the database, wherein each of the one or more secondary players shares a threshold amount of attributes with the POI;

extract attributes of the one or more secondary players; and generate the live component vector based on the extracted attributes of the one or more secondary players.

14. The non-transitory computer readable medium of claim 11, further comprising instructions that cause the processor to:

at a conclusion of the current event, determine the actual performance of the POI during the current event by querying one or more remote servers for data describing the actual performance of the POI; and normalize the live metric determined by the first machine learning model based on the actual performance of the POI during the current event.

15. The non-transitory computer readable medium of claim 11, wherein instructions for generating the long-term component vector further cause the processor to:

query a database stored at a remote server to identify one or more secondary players stored in the database, wherein each of the one or more secondary players shares a threshold amount of attributes with the POI;

extract attributes of each of the one or more secondary players; and update the long-term component vector based on the attributes extracted from the one or more secondary players.

16. The non-transitory computer readable medium of claim 11, wherein instructions for generating the long-term component vector further cause the processor to:

access live metrics determined for a plurality of historical events preceding or occurring during the time period; and update the long-term component vector based on the accessed live metrics, wherein each live metrics is assigned a relative weight based on a time when the live metric was determined.

17. The non-transitory computer readable medium of claim 11, further comprising instructions that cause the processor to:

responsive to determining the POI suffered an injury, generating an injury component vector comprising the attributes of the POI;

generate an injury prediction characterizing an impact of the injury on the POI during a time period by inputting the injury component vector into a third machine learning model, wherein the third machine learning model is trained using a third training dataset comprising training data, each entry of training data comprising attributes of a POI historically affected by the injury and labeled with an effect of the injury on the historically affected POI; and update the long-term component vector to include the injury prediction.

18. The non-transitory computer readable medium of claim 11, wherein the live metric is determined at a first time during the current event, the instructions further causing the processor to:

generate a second live component vector comprising the attributes of the POI, the attributes of the team, the inherent properties of the event, and the live metric determined for the current event; and determine a second live metric characterizing the performance of the POI at a second time during the current event by inputting the second live component vector into the first machine learning model.

\*     \*     \*     \*     \*